United States Patent
Nagata

(10) Patent No.: US 7,048,666 B2
(45) Date of Patent: May 23, 2006

(54) SILENT CHAIN POWER TRANSMITTING APPARATUS

(75) Inventor: Shigeyoshi Nagata, Tokyo (JP)

(73) Assignee: Hitachi Powdered Metals Co., Ltd., Chiba (JP)

( * ) Notice: Subject to any disclaimer, the term of this patent is extended or adjusted under 35 U.S.C. 154(b) by 268 days.

(21) Appl. No.: 10/668,239

(22) Filed: Sep. 24, 2003

(65) Prior Publication Data

US 2004/0060804 A1    Apr. 1, 2004

(30) Foreign Application Priority Data

Sep. 25, 2002    (JP)    ............................ 2002-279958

(51) Int. Cl.
*F16G 13/04*    (2006.01)

(52) U.S. Cl. ..................... 474/212; 474/213

(58) Field of Classification Search ........ 474/212–215, 474/152–157, 223–229, 207
See application file for complete search history.

(56) References Cited

U.S. PATENT DOCUMENTS

| 327,446 | A | | 9/1885 | Knowlton | |
|---|---|---|---|---|---|
| 1,598,906 | A | * | 9/1926 | Dull | 474/214 |
| 1,693,431 | A | * | 11/1928 | Behning | 474/207 |
| 2,056,602 | A | * | 10/1936 | Dull et al. | 474/157 |
| 2,769,346 | A | | 11/1956 | Flocke | |
| 3,316,771 | A | * | 5/1967 | Nichols | 474/207 |
| 4,758,209 | A | * | 7/1988 | Ledvina | 474/156 |
| 4,759,740 | A | * | 7/1988 | Cradduck | 474/212 |
| 4,832,668 | A | * | 5/1989 | Ledvina et al. | 474/155 |
| 4,915,675 | A | * | 4/1990 | Avramidis | 474/213 |
| 5,464,374 | A | * | 11/1995 | Mott | 474/224 |
| 5,628,702 | A | | 5/1997 | Kotera | |
| 6,533,691 | B1 | * | 3/2003 | Horie et al. | 474/213 |

FOREIGN PATENT DOCUMENTS

| EP | 0 463 711 A1 | 1/1992 |
|---|---|---|
| JP | 61-211556 A | 9/1986 |

* cited by examiner

*Primary Examiner*—Marcus Charles
(74) *Attorney, Agent, or Firm*—Sughrue Mion, PLLC

(57) ABSTRACT

A silent chain power transmitting apparatus has an endless link chain having a plurality of link plates (11A,11B,11C, . . . ) connected together, and sprocket wheels (20). Each of an inside flank (13) and an outside flank (14) of each link plate (11A,11B,11C, . . . ) is profiled by a circular shape of a same radius ($\rho$) of curvature whose individual center (d1, . . . ) of curvature is on a chain pitch line (PL). Each tooth (22) of the sprocket wheel (20) is profiled by a circular shape of the same radius ($\rho$) of curvature, which is meshed with corresponding inside flank (13) and outside flank (14) of each link plate (11A,11B,11C, . . . ). A power of the sprocket wheel (20) is transmitted to the link plates (11A,11B,11C, . . . ) in linear contact (or surface contact) momentarily, not in point contact.

7 Claims, 4 Drawing Sheets

SILENT CHAIN POWER TRANSMITTING APPARATUS

BACKGROUND OF THE INVENTION

1. Field of the Invention

The present invention relates to a silent chain power transmitting apparatus with no or a low mechanical wear generated between a silent chain and two or more sprockets and capable of operating with low noise.

2. Description of the Related Art

FIG. 6 is a diagram showing a configuration of a sprocket wheel and a silent chain (or an endless silent chain) comprising a plurality of link plates in a conventional silent chain power transmitting apparatus. FIG. 7 is a diagram showing a configuration of the link plates in the silent chain of the conventional silent chain power transmitting apparatus. In FIG. 6 and FIG. 7, reference character 110P designate a silent chain and 120P denotes the sprocket wheel having a plurality of teeth 122. The silent chain 110P is made up of a predetermined number of link plates 111A, 111B, 111C, ... which are connected together through connecting pins 116 in endless form. Each link plate has a pair of teeth 112 and a pair of pin holes 115. Each link plate is connected together through each connecting pin 116 inserted into the corresponding pin hole 115. FIG. 6 and FIG. 7 show the link plates 111A, 111B, and 111C as a part of the entire of the link plate.

As shown in FIG. 6, each tooth 112 of the silent chain 110P is formed in a same configuration, each tooth 112 has an inside flank 113 and an outside flank 114. The inside flank 113 and the outside flank 114 are profiled by a straight line.

In FIG. 6 and FIG. 7, reference character PL designates a chain pitch line. The chain pitch line PL is a straight line connecting the center of each connecting pin 116 inserted into the corresponding pin hole 115 of each link plate 111A, 111B, 111C, .... Reference character P denotes a pitch of the silent chain, and $\Psi$ is $2\pi/N$ radian, where $\pi$ is a ratio of the circumference of a circle to its diameter, and N is the number of the teeth of a sprocket wheel (not shown in FIG. 6).

As shown in FIG. 6 and FIG. 7, the sprocket wheel 120P in the conventional silent chain power transmitting apparatus has a predetermined number of the teeth 122, each of which is meshed with the corresponding tooth 112 of the link chain of the silent chain 110P. Each tooth 122 of the sprocket wheel 120P is profiled by an involute curve. That is, each tooth 122 is an involute tooth.

In the configuration of the conventional silent chain power transmitting apparatus described above, the power of the sprocket wheel 120P as a driving side is transmitted to another sprocket wheel 120P as a slave side by meshing the teeth 112 of each link plate 111A, 111B, 111C, ... of the silent chain 110P with the corresponding teeth 122 of the sprocket wheels 120P according to the revolution of the sprocket wheel 120P as the driving side.

In the conventional silent chain power transmitting apparatus described above, each of the inside flanks 113 and the outside flanks 114 of each link plate 111A, 111B, 111C, ... is profiled by the linear shape, and each tooth 122 of the sprocket wheel 120P is profiled by the involute shape curve.

The contact between the teeth 122 of the sprocket wheel 120P and the inside flanks 113 and the outside flanks 114 of the link plates 111A, 111B, 111C, ... causes to increase both a relative of curvature and a slip ratio. The conventional silent chain power transmitting apparatus involves several drawbacks that the surface stress at the contact area is high so that the mechanical wear is generated between a link plate and a sprocket wheel.

Generally, the link plates 111A, 111B, 111C, ... are made up of quenched steel to avoid rupture of a link chain. On the other hand, the sprocket wheel 120P is made up of steel or sintered metal. However, because the sintered metal is lower in mechanical property such as tensile strength and bending strength than the steel. Therefore it is difficult to keep the wear resistance of the sprocket wheel when the link plate made up of quenched steel and the teeth of the sprocket wheel made up of quenched sintered metal are meshed together. And it is expensive to apply high grade material to the link plate and/or the sprocket wheel on the purpose to avoid the above drawbacks.

In addition, although the silent chain power transmitting apparatus generates a relatively low driving noise when compared with the noise generated by the roller-chain power transmitting method, there is a strong demand to further reduce the driving noise.

SUMMARY OF THE INVENTION

The present invention has been made to solve the above drawbacks of the conventional silent chain power transmitting apparatus.

It is therefore an object of the present invention to provide a silent chain power transmitting apparatus with no mechanical wear generated between a link plate and a sprocket wheel and a low driving noise.

To achieve the foregoing object, according to the present invention, there is provided a silent chain power transmitting apparatus having one or more sprocket wheels and a silent chain made up of a plurality of link plates. In the silent chain power transmitting apparatus, each link plate has a pair of teeth composed of an inside flank and an outside flank. The link plates are connected to each other through connecting pins in endless form, and the sprocket wheel has a predetermined number of teeth meshed with the teeth of the silent chain. In the apparatus, each of the inside flank and the outside flank is composed of a circular shape of a same radius of curvature whose individual center of curvature is on a pitch line of the silent chain. Each of the teeth of the sprocket wheel is profiled by the circular shape of the same radius of curvature of the inside flank and the outside flank of the link plate.

BRIEF DESCRIPTION OF THE DRAWINGS

Other objects, features and advantages of the present invention will become apparent from the following description taken in conjunction with the accompanying drawings, in which.

DETAILED DESCRIPTION OF THE PREFERRED EMBODIMENTS

A detailed description will be given, with reference to the accompanying drawings, of the preferred embodiments of the present invention.

Embodiment

Figure 1:
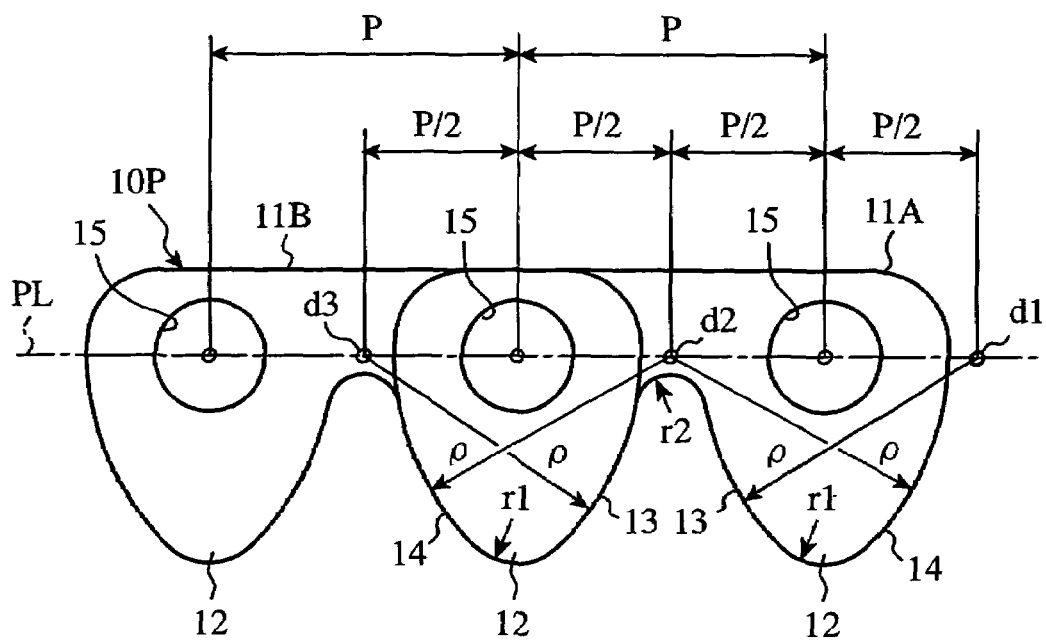
FIG. 1 is a diagram showing a configuration of a part of a silent chain in a silent chain power transmitting apparatus of an embodiment according to the present invention.
Figure 2:
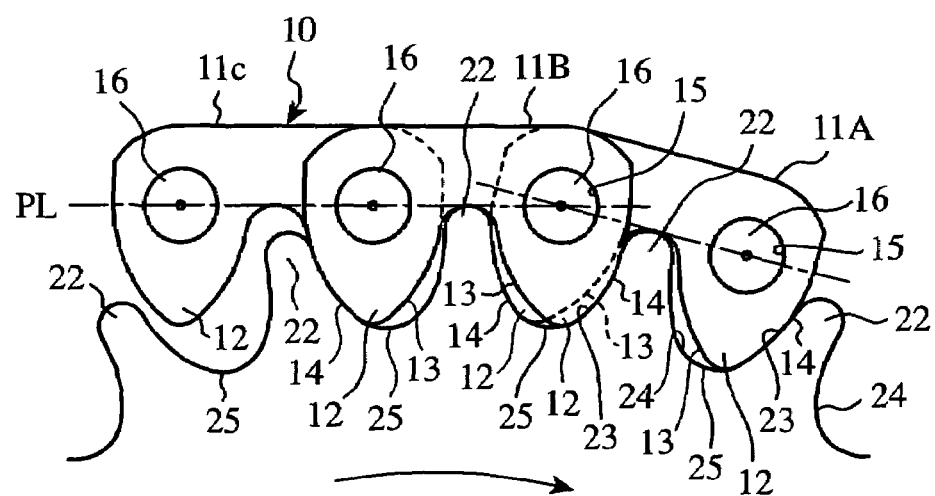
FIG. 2 is a diagram showing a part of link plates of the silent chain wrapped around a sprocket wheel in the silent chain power transmitting apparatus of the embodiment.
Figure 3:
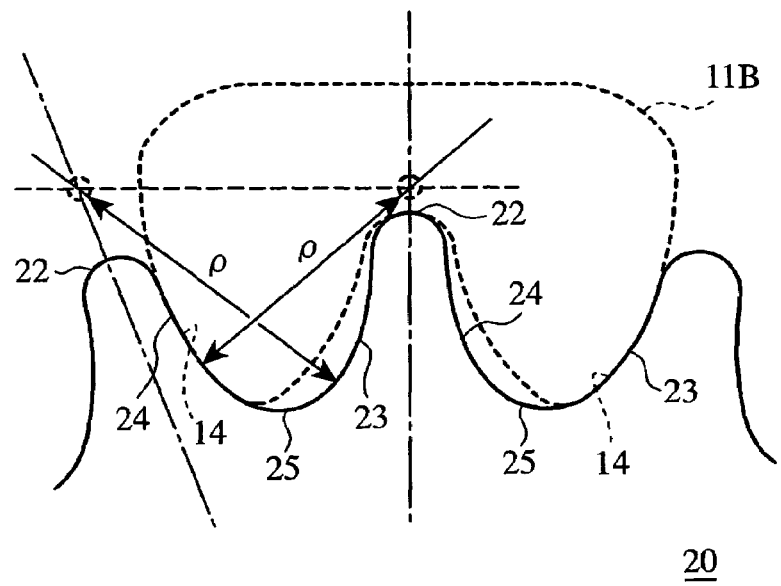
FIG. 3 is a diagram showing a configuration of a part of the sprocket wheel in the silent chain power transmitting apparatus of the embodiment according to the present invention.

FIG. 1 is a diagram showing a configuration of a part of a silent chain in a silent chain power transmitting apparatus according to an embodiment of the present invention. FIG. 2 is a diagram showing a part of link plates wrapped around a sprocket wheel in the silent chain power transmitting apparatus of the embodiment. FIG. 3 is a diagram showing a configuration of a part of the sprocket wheel in the silent chain power transmitting apparatus of the embodiment.

Figure 6:
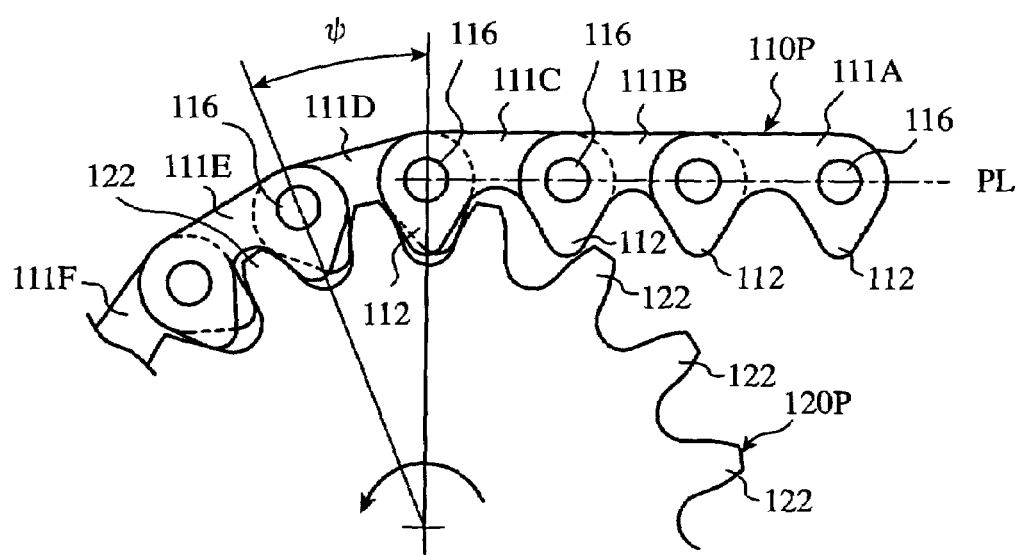
FIG. 6 is a diagram showing a configuration of link plates and a sprocket wheel in a conventional silent chain power transmitting apparatus.
Figure 7:
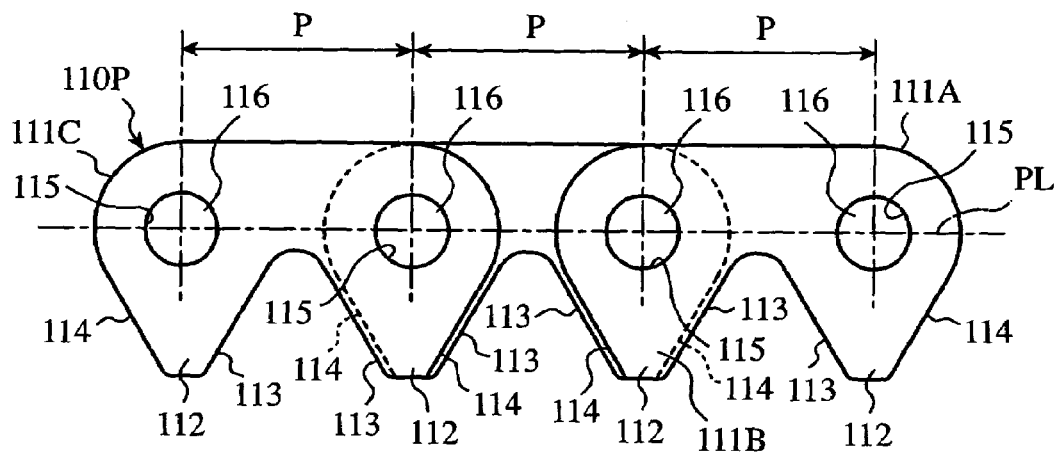
FIG. 7 is a diagram showing a configuration of the link plates in the conventional silent chain power transmitting apparatus.

Although both the silent chain power transmitting apparatus of the present invention shown in FIG. 1, FIG. 2, and FIG. 3 and the conventional one shown in FIG. 6 and FIG. 7 have a same basic configuration, in particular, the difference in configuration between them is that an inside flank 13 and an outside flank 14 of each link plate 11A, 11B, 11C, . . . of the silent chain power transmitting apparatus of the present invention are profiled by a circular shape of a same radius ρ of curvature. The individual centers d1, d2, d3, . . . of the circular shapes of the inside flank 13 and the outside flank 14 of the link plates 11A, 11B, 11C, . . . are on a chain pitch line PL. Each of the link plates 11A, 11B shown in FIG. 1 has a pair of the teeth 12 and a pair of the pin holes 15.

Each of both tooth flanks (or tooth surfaces) 23 and 24 of the tooth 22 of the sprocket wheel 20 has the circular shape of the same radius ρ of curvature or the circular shape of a radius of curvature which is within the manufacturing error over zero to 5% of the radius ρ of curvature of each of the inside flank 13 and the outside flank 14 of each link plate, meshed together.

In FIG. 2 and FIG. 3, reference number 25 designates a concave portion formed between the adjacent teeth 22. The radius of curvature of each concave portion 25 in the sprocket wheel 20 is different from the radius of curvature of each tooth 12 of the link plate.

FIG. 1, FIG. 2, and FIG. 3 only show a part of the link plates 11A, 11B and 11C, and the sprocket wheel 20 in the driving side. In FIG. 1, the inside flanks 13 of the link plate 11A are so formed that they are profiled by a circular shape of a radius ρ of curvature around each center point d1 and d3 of curvature which are on the chain pitch line PL. The outside flanks 14 of the link plate 11A are profiled by the circular shape of the radius ρ of curvature around a center point d2 on the chain pitch line PL. That is, the inside flanks 13 and the outside flanks 14 in the link plate 11A are profiled by the circular shape of the same radius ρ of curvature.

The portion between the inside flank 13 and the outside flank 14 in the link plate 11A is profiled by a circular shape of a radius r1 (see FIG. 1) of curvature. The portion formed between both the inside flanks 13 of the same link plate 11A is profiled by a circular shape of a radius r2 (see FIG. 1) of curvature.

In FIG. 1, reference character P designates a pitch of the silent chain 10, and PL denotes the chain pitch line. The chain pitch line PL is a line connecting the centers of the connecting pins 16 inserted in the corresponding pin holes 15 of the link plates 11A, 11B, 11C, . . . , .

The center points, for example, designated by the reference characters d2, . . . as shown in FIG. 1, are positioned from the center point of the connecting pin 16 by P/2. Other link plates 11B, 11C, . . . have the same configuration of the link plate 11A.

Each of the one tooth flank 23 and the other tooth flank 24 of the tooth 22 of the sprocket wheel 20 shown in FIG. 2 and FIG. 3 is also profiled by the circular shape of the same radius ρ of curvature which corresponds to the inside flank 13 and the outside flank 14 of each link plate 11A, 11B, 11C, . . . .

Figure 4:
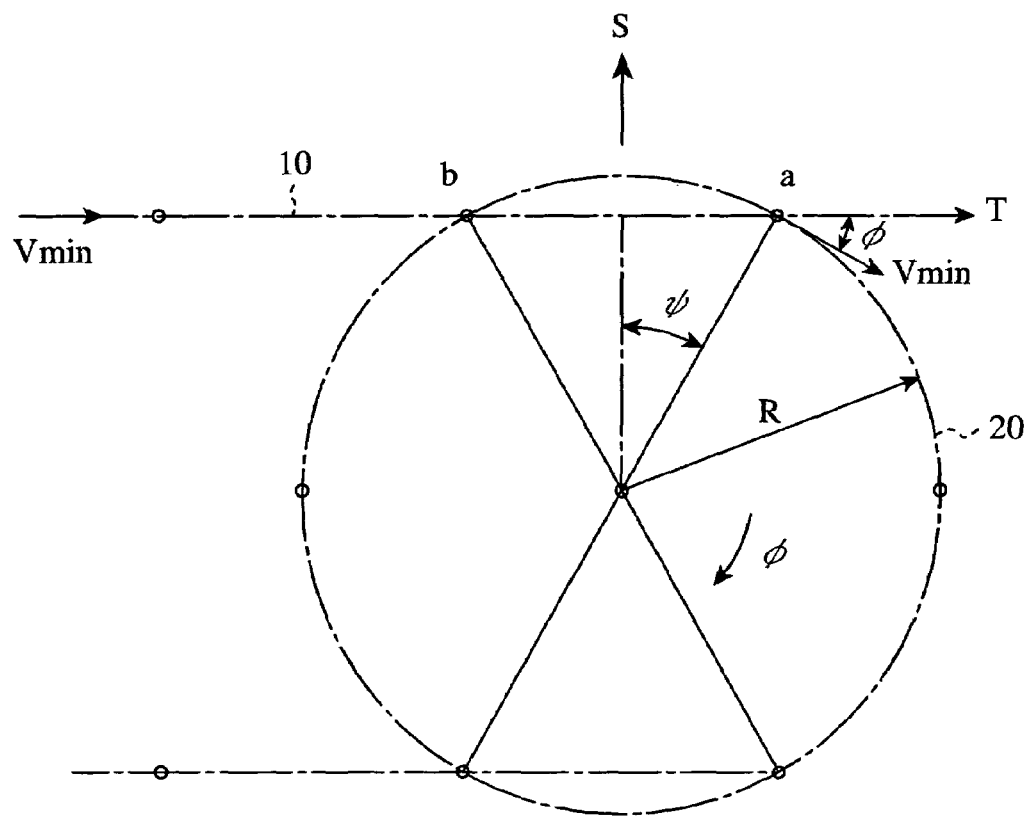
FIG. 4 is a diagram showing an ununiform motion of a silent chain of the silent chain power transmitting apparatus.
Figure 5:
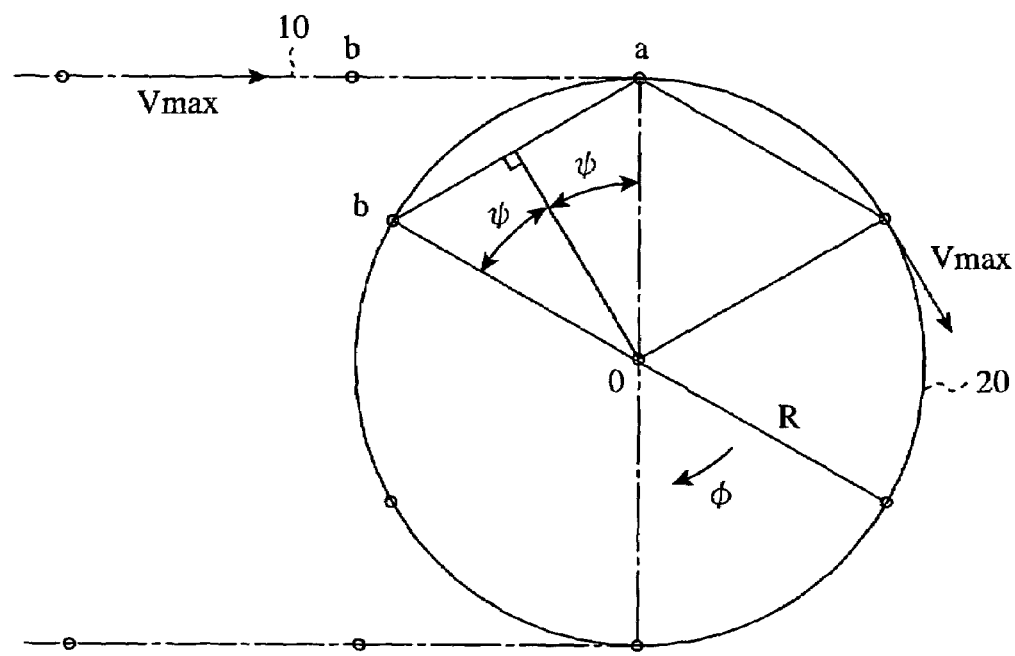
FIG. 5 is a diagram showing the ununiform motion of the silent chain of the silent chain power transmitting apparatus.

As shown in FIG. 4 and FIG. 5, in the silent chain power transmitting apparatus of the present invention having the configuration described above, the silent chain 10 is wrapped in point contact around the sprocket wheel 20 at the contacting point "a", "b", for example, in a shape of an equilateral polygon and the silent chain 10 can be moved with an ununiform motion (nonlinear motion) even if the sprocket wheel 20 operates in an uniform revolution. That is, the speed of the motion of the silent chain 10 is changed in a range of the minimum value Vmin (=Rω· cos Ψ) to the maximum value Vmax (=Rω), where R is a radius of a pitch circle of the sprocket wheel 20, ω is an angular speed dΨ/dt of the sprocket wheel 20, and Ψ is π/N radian (wherein n is a ratio of the circumference to its diameter and N is the number of teeth of the sprocket wheel 20).

The silent chain 10 and the sprocket wheel 20 in the silent chain power transmitting apparatus of the embodiment according to the present invention operate in conjugate motion, like the motion between a rack and a pinion of a gear.

A description will now be given of the explanation for the concept of the silent chain power transmitting apparatus of the present invention using an equivalent configuration where the linear part of the silent chain 10 is replaced with a rack and the sprocket wheel 20 is replaced with a pinion.

It can be considered that the relative speed between the revolution motion of the pinion and the linear motion of the rack is a revolution motion around a pitch point based on the profile theory for gear and tooth.

A circular shaped tooth of the rack around the center of the pitch point can be meshed momentarily with a circular shaped tooth of the pinion. In practice both the radius of curvature of the tooth of the inside flank and the outside flank of the link plate are same.

The circular shaped tooth of the rack corresponds to each of the inside flank 13 and the outside flank 14 of each link plate 11A, 11B, 11C, . . . . The circular shaped tooth of the pinion corresponds to the tooth flanks 23 and 24 of each tooth 22 of the sprocket wheel 20P.

In the silent chain power transmitting apparatus of the present invention, each of the inside flanks 13 and the outside flanks 14 in the link plates 11A, 11B, 11C, . . . is profiled by a same circular shape of the same radius ρ of curvature whose center d1 of curvature is on the pitch line PL of the link chain. In addition, each of the tooth flanks 23 and 24 of the tooth 22 of the sprocket wheel 20 is also profiled by the circular shape of the same radius ρ of curvature which corresponds to the inside flank 13 and the outside flank 14 of each link plate 11A, 11B, 11C, . . . .

This configuration allows that both a relative of curvature and a slip ratio of the contact between each of the link plates 11A, 11B, 11C, . . . and the corresponding tooth 22 of the sprocket wheel 20 becomes zero.

The stress of the surface pressure generated between the link plates and the teeth of the sprocket wheel is small, and a mechanical wear becomes low even if the link plates and the sprocket wheels are made up of a low strength material.

In addition, each of the inside flank 13 and the outside flank 14 of link plates 11A, 11B, 11C, . . . does not contact to the corresponding tooth flanks of the sprocket wheel until the momentary time only when they are meshed together, for example, when the outside flanks 14 and 14 of the link plate 11B and the tooth flanks 23 and 24 of the sprocket wheel 20 are meshed together at a momentary time shown in FIG. 2 and FIG. 3, based on the ununiform motion (nonlinear motion) of the silent link chain. This can achieve to contact them smoothly and to reduce a motion or operation noise.

As set forth in detail, according to the present invention, the inside flank and the outside flank of each link plate are profiled by a circular shape of a same radius of curvature whose center of curvature is on the silent chain pitch line PL. Each tooth of the sprocket wheel is formed with the same profile of the inside flank and the outside flank of each link plate meshed together. It is therefore possible to reduce a mechanical wear generated between the link plates of the silent chain and the sprocket wheel.

The conventional silent chain power transmitting apparatus requires that the link plates and the sprocket wheels are made up of materials of a high wear resistance. On the contrary, because the degree of the mechanical wear generated between the link plates 11A, 11B, 11C, . . . and the sprocket wheel 20 in the silent chain power transmitting apparatus of the present invention is zero, it is possible that the link plates and the sprocket wheel are composed of one of a steel, a sintered metal, an iron, a ferrous alloy, nonferrous alloy, and nonmetal such as a plastic.

The present invention does not limit any kind of those materials making the link plates and the sprocket wheel.

Figure 8A:
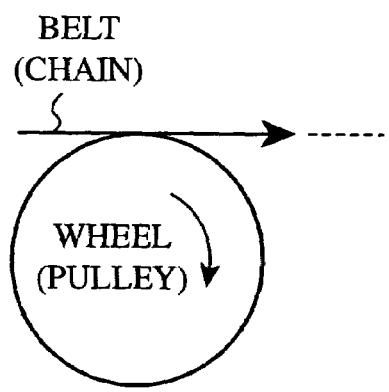
FIG. 8A and FIG. 8B are diagrams showing a concept of the motion of a conventional power transmitting apparatus using a belt and a pulley correspondent to the silent chain drive principle.
Figure 8B:
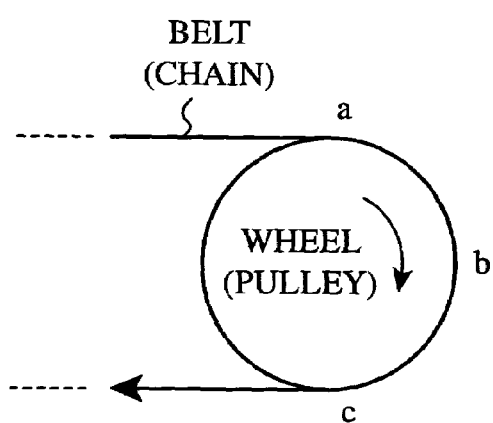

By the way, in a case that the conventional link chain power transmitting apparatus uses a belt and pulleys, a slip occurs between the belt and the pulley because the belt is contacted only to the pulley in a case shown in FIG. 8A. This case can not obviously transmit the power of the pulley to the belt. Accordingly, the conventional silent chain power transmitting apparatus uses a tooth shape for conjugate motion between a rack and a pinion because the designers for the silent chain power transmitting apparatus persist in a preconceived idea. For example, when the silent chain is profiled by a straight line, the tooth of the sprocket wheel is profiled by an involute curve or a curve similar to the involute curve. Thereby, as shown in FIG. 8B, the belt is contacted in point contact to the pulley at the contacting points a, b, and c, so as to transmit the power of the pulley to the belt. However, in this conventional case, when the sprocket wheel is composed of a sintered metal and the surface pressure generated between the link plates and the sprocket wheel so as to prevent any occurrence of slip and impact, the degree of the wear of the sprocket wheel becomes greatly high and vibratory sounds, impact sounds or motion sounds, and vibration thereby occur. Further, because the silent chain and the sprocket wheel are contacted together in point contact at the contacting points and also operate in effect of non linear motion and dynamic force, it is necessary to form the sprocket wheel and the link chains with an expensive powder material.

On the contrary, in the silent chain power transmitting apparatus of the present invention, each of the inside flank and the outside flank of the link plates and each tooth of the sprocket wheel is profiled by a circular shape whose center is on the link plate pitch line PL. It is thereby possible to obtain a contact interval of zero and a relative of curvature of zero (completely contacted momentarily) between the inside flank and the outside flank of each link plate and the corresponding teeth of the sprocket wheel. As a result, the link plate is contacted to the sprocket wheel momentarily without slip and with no effect of the ununiform motion (nonlinear motion) of the silent link chain.

Thus, in the silent chain power transmitting apparatus of the present invention, because the flanks of the link plates of the link chain and the teeth of the sprocket wheel are completely contacted in linear contact (or surface contact) because the link chain is momentarily and completely set in the teeth of the sprocket wheel, not in point contact in the conventional case shown in FIG. 8B, it is possible to form them with a spur gear, and not to form them with a helical gear.

Furthermore, it is possible to form the link plates of the link chain and the sprocket wheel with nonferrous metals such as a plastic, for example. In this case, it is possible to transmit the power of the sprocket wheel to the link chain in a reduced motion noise when compared with the case where they are composed of a metal material. Theoretically, the momentary contact profile is only and one proposed by the present invention.

While the above provides a full and complete disclosure of the preferred embodiments of the present invention, various modifications, alternate constructions and equivalents may be employed without departing from the scope of the invention. Therefore the above description and illustration should not be construed as limiting the scope of the invention, which is defined by the appended claims.

What is claimed is:

1. A silent chain power transmitting apparatus comprising sprocket wheels and a silent chain having a plurality of link plates, each link plate having a pair of teeth, each of the teeth having an inside flank and an outside flank, the link plates being connected to each other through connecting pins so as to form endless silent chain, and the sprocket wheel having a predetermined number of sprocket teeth meshed with the teeth of the silent chain, wherein each of the inside flank and the outside flank is profiled by a circular shape of the same radius of curvature whose individual center of curvature is on a pitch line of the silent chain, and each of the teeth of the sprocket wheel is profiled by a circular shape of the same radius of curvature as the inside flank and the outside flank of the link plate teeth.

2. The silent chain power transmitting apparatus according to claim 1, wherein a radius of curvature of a circular shape of a concave portion formed between adjacent teeth of the sprocket wheel is different from the radius of curvature of the circular shape of the tooth formed between the adjacent inside flank and outside flank of the link plate.

3. The silent chain power transmitting apparatus according to claim 1, wherein the sprocket wheel and the link plates are composed of one of a steel, a sintered metal, an iron, a ferrous alloy, nonferrous alloy, and nonmetal such as a plastic.

4. A silent chain power transmitting apparatus according to claim 1, wherein each of the teeth of the sprocket wheel is profiled by the circular shape of a radius of curvature which is within a manufacturing error from zero to 5% of the radius of curvature of each of the inside flank and the outside flank.

5. A silent chain powered transmitting apparatus comprising:

sprocket wheels having a predetermined number of teeth; and a plurality link of plates having a pair of teeth, each of the link plates connected by connecting pins to form an endless chain, each of the link plate teeth having an inside flank and an outside flank;

wherein, each of the inside flank and each of the outside flank is profiled by a first convex curvature having a radius which has a center of curvature on a pitch line of the chain, and each of the teeth of the sprocket wheels have symmetric flanks profiled by a second convex curvature which is the same as the first convex curvature.

6. The silent chain powered transmitting apparatus according to claim 5, wherein a concave portion on the sprocket between the sprocket teeth has a first radius of curvature which is greater than a second radius of curvature on a portion formed between the adjacent inside flank and outside flank of each of the teeth.

7. The silent chain powered transmitting apparatus according to claim 5, wherein the center of curvature of the outside flank of both a first tooth and a second tooth on a first link plate is located on the pitch line midway between the connecting pins on the link plate, the center of curvature of the inside flank of the first tooth is located on the pitch line midway between the connecting pins on a second link plate adjacent to the first tooth side of the first link plate, and the center of curvature of the inside flank of the second tooth is located on the pitch line midway between the connecting pins on a third link plate adjacent to the second tooth side of the first link plate.

* * * * *